United States Patent [19]
Kroll et al.

[11] 3,868,398
[45] Feb. 25, 1975

[54] ORGANO METAL COMPLEXES

[75] Inventors: Wolfram R. Kroll, Somerville; Robert B. Long, Atlantic Highlands, both of N.J.

[73] Assignee: Exxon Research and Engineering Company, Linden, N.J.

[22] Filed: Aug. 21, 1970

[21] Appl. No.: 65,957

[52] U.S. Cl..... 260/438.1, 260/674 SA, 260/677 A, 260/679 A
[51] Int. Cl. .............................................. C07f 1/08
[58] Field of Search ................................. 260/438.1

[56] References Cited
UNITED STATES PATENTS

| | | | |
|---|---|---|---|
| 2,993,035 | 7/1961 | Christman | 260/94.3 |
| 3,020,298 | 2/1962 | Ashby | 260/448 |
| 3,098,862 | 7/1963 | Kobetz | 260/429.7 |
| 3,134,823 | 5/1964 | Brown | 260/676 |
| 3,467,725 | 9/1969 | Walker | 260/674 |

OTHER PUBLICATIONS
Chemical Abstracts, Vol. 55, pp. 360i–361a (1961).
Chemical Abstracts, Vol. 56, pg. 4347g (1962).
Chemical Abstracts, Vol. 62, 7250b (1965).

*Primary Examiner*—H. Sneed
*Attorney, Agent, or Firm*—J. E. Luecke; F. A. Santoro

[57] ABSTRACT

Cuprous organohaloaluminates and cuprous organohaloborates possessing the general formula $CuMRX_3$ wherein M is a boron or aluminum atom, X is a chlorine, bromine or fluorine atom, and R is a monovalent lower alkyl radical, phenyl radical, alkylaryl radical or substituted alkyl phenyl or alkylaryl radical, readily complex with olefins, diolefins, acetylenes, aromatics, carbon monoxide, etc. The cuprous organohaloaluminates and cuprous organohaloborates are employed in the separation and recovery of complexible ligands from feedstreams containing the same. Typically, a feedstream containing a complexible ligand is contacted with a liquid sorbent system comprising the cuprous organohaloaluminate and/or cuprous organohaloborate. The complexible ligands contained in the feedstream complex with the organometal compositions and are ultimately recovered therefrom by a ligand exchange operation generally requiring n-1 ligand exchange operations for n complexed complexible ligands to be separated and recovered. The separation in each of the ligand exchange operations is accomplished by contacting the organometal-complexible ligand complex with a stripping ligand that forms a more stable complex with the organometallic material than the complexible ligand or ligands, thereby exchanging the stripping complexible ligand or ligands in the original sorbent complex.

12 Claims, 1 Drawing Figure

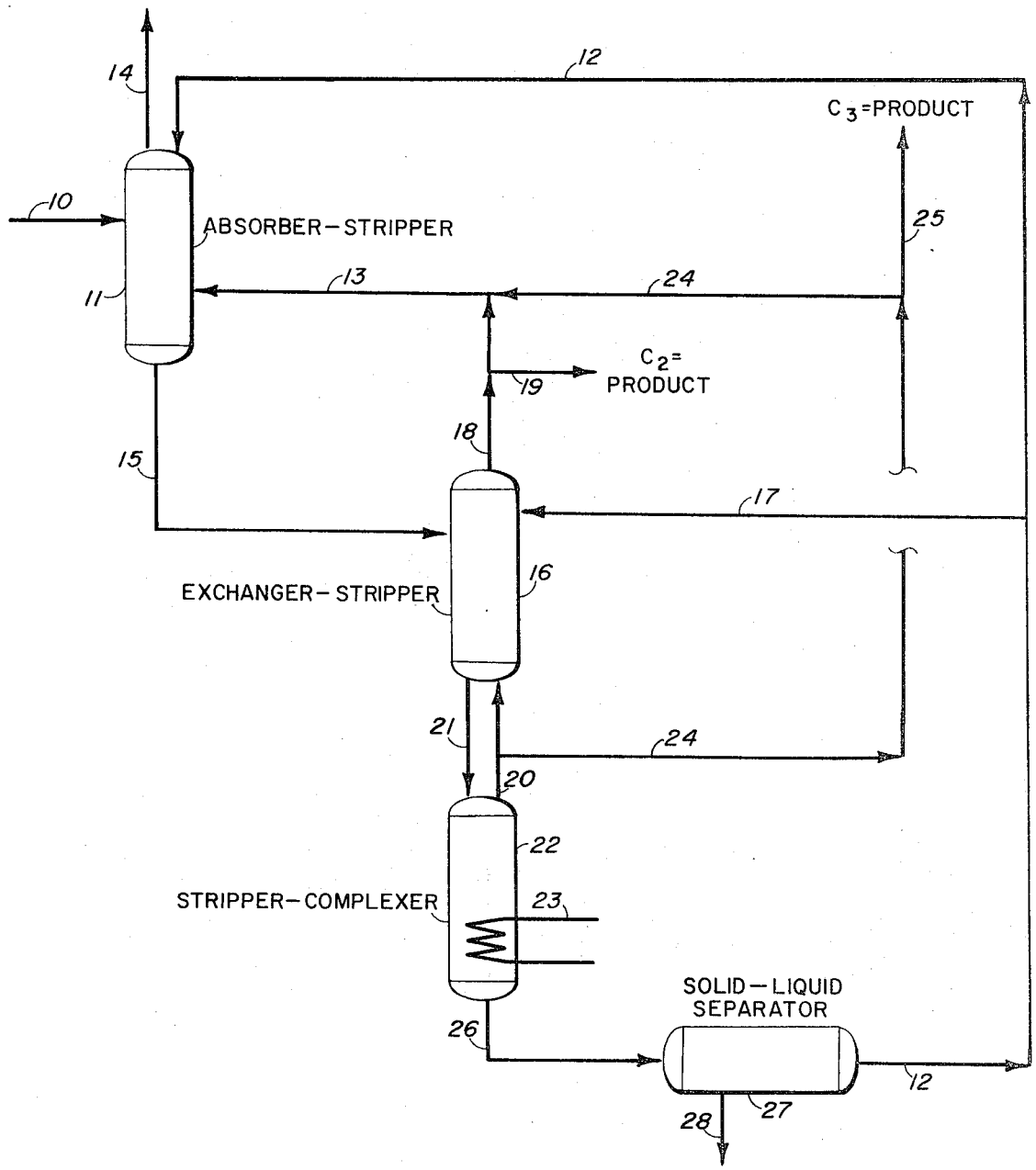

ORGANO METAL COMPLEXES

BACKGROUND OF THE INVENTION

Field of the Invention

This invention is directed to novel organometallic compositions, organometallic/complexible ligand complexes, and a process for the recovery of complexible ligands. More particularly, the present invention is directed to cuprous organohaloaluminate and cuprous organohaloborate compounds, complexes of cuprous organohaloaluminates and cuprous organohaloborates with complexible ligands and a process for the recovery of complexible ligands from feedstreams containing the same using sorbent system based on cuprous organohaloaluminates and cuprous organohaloborates.

SUMMARY OF THE INVENTION

Now, in accordance with the present invention, organo metal materials possessing the general formula $CuMRX_3$ wherein M is a boron or aluminum atom, X is a chlorine, bromine or fluorine atom, and R is an organo radical are provided. The organometal compounds readily form complexes with ligands, e.g., $CuMRX_3 \cdot 2$ (ligand) and $CuMRX_3 \cdot 1$ (ligand). Further, complexible ligands that are contained in a liquid or gaseous feedstream may be separated from the feedstream by contacting the feedstream with a liquid sorbent system comprising the $CuMRX_3$ compositions whereby the complexible ligands are complexed with the sorbent system. The complexed complexible ligands are recovered from the sorbent system in at least one ligand exchange reaction wherein a stripping ligand, which is also a complexible ligand and which forms a more stable complex with the sorbent system than the ligand or ligands to be recovered, it is contacted with the sorbent system/complexible ligand complex, thereby displacing the ligands to be recovered from the original sorbent system/complexible ligand complex. Typically, the $CuMRX_3$ material may be used alone or in combination with other sorbent systems such as $CuMX_4$ materials wherein M and X are as defined above. The sorbent system/complexible ligand complex may be subjected to a series of exchange reactions wherein the complex is contacted with increasingly more stable complex-forming stripping ligands until all of the complexed complexible ligands and ultimate organometal-stripping ligand complex is recovered. The ultimate complex or the original complex formed by contacting the feedstream with the organometal based sorbent system may be decomplexed by subjecting the complex to elevated temperatures and/or reduced pressures.

BRIEF DESCRIPTION OF THE DRAWING

The drawing is a flow diagram illustrating a preferred technique for the recovery of high purity ethylene and propylene from a stream containing the same using cuprous organohaloaluminate and/or cuprous organohaloborate based sorbent systems.

The organometal compositions of the present inventions are represented by the general formula $CuMRX_3$. In the general formula, M designates a boron or aluminum atom, X is a halogen atom or a mixture of halogen atoms, preferably chlorine, bromine and fluorine atoms and most preferably chlorine atoms and R is an organo radical, preferably a monovalent hydrocarbon radical having from 1 to 12, preferably 1 to 6 carbon atoms. Preferably R is (a) a $C_1$–$C_4$ monovalent alkyl radical, e.g., methyl, ethyl, propyl, isobutyl, etc.; (b) a phenyl radical; (c) a $C_7$–$C_{10}$ alkylaryl radical such as tolyl, xylyl, 2,4-diethylphenyl, etc.; and (d) halogen substituted, preferably chlorine substituted $C_1$–$C_4$ alkyl, phenyl and $C_7$–$C_{10}$ alkylaryl radicals, for example, chloromethyl, dichloroethyl, 2-chloropropyl, 1-chloro-2-bromoethyl, 2,2-difluoropropyl, chlorophenyl, 2-chloro-4-phenylethyl, etc.

The cuprous organohaloaluminate and cuprous organohaloborate compositions are readily prepared using a number of techniques. It is necessary that the organometallic formation reactions be conducted in the liquid phase in the substantial absence of water and/or oxygen. One method for the preparation of cuprous organohaloaluminates is by dissolving an alkyl aluminum compound or an alkyl aluminum dihalide compound in either liquid olefins, such as cyclohexene, or aromatic materials, such as benzene or toluene, and slurrying the resulting solution with a cuprous halide, such as cuprous chloride. The cuprous organohaloaluminate materials form complexes in situ with the olefin and/or aromatic diluents to give a mobile liquid complex. The preferred starting aluminum compositions possess the general formula $AlRX_2$ or $R_3Al_2X_3$ (aluminum sesquihalide) wherein R and X are as previously described. The cuprous organohaloborate compositions are prepared by essentially the same technique except that an alkyl boron compound is substituted for the alkyl aluminum compound. In the case of fluoride containing compositions, CuF is not available and the desired product is secured by reduction of the corresponding cupric salt with metallic copper or with excess boron alkyl compound.

As noted above, the aluminate and borate organometallic compositions are preferably formed in a suitable reaction mixture, that is, dissolved or dispersed in a normally liquid solvent. The solvent material employed can be a material that forms a complex with cuprous organohaloaluminates or cuprous organohaloborates or may be a non-ligand type solvent. Useful solvent materials for the aluminate and borate formation reactions include compositions such as (a) $C_6$–$C_{20}$ aromatic compounds ("aromatic" defined as being aromatic compositions including condensed ring aromatics and alkyl substituted derivatives thereof), e.g., benzene, toluene, xylene, ethylbenzene, naphthalene, phenanthrene, diethylbenzene, 2-ethyl-4-propyl benzene, t-butyl benzene, 2-methyl-5-propyl benzene, etc. (b) $C_3$–$C_{22}$, preferably $C_5$–$C_{12}$ olefinic hydrocarbons, most preferably cyclic and bicyclic olefins, having up to about three ethylenic sites of unsaturation per molecule, e.g, propylene, cyclohexene, cyclooctene, dicyclopentadiene, ethylidene norbornene, vinyl norbornene, norbornadiene, narrow cut propylene polymers, etc.; (c) $C_2$–$C_{10}$ preferably $C_2$–$C_6$, alkyl, alkenyl, and aryl nitrile compounds, such as acetonitrile, acrylonitrile, benzonitrile, etc. The preferred solvent materials are $C_6$–$C_{16}$ aromatics and $C_5$ to $C_{12}$ cyclic and bicyclic olefins.

The solvent material need not be a normally liquid composition, that is, the solvent system is usable if it is in substantially the liquid state at either elevated pressures or reduced temperatures. However, for process simplicity, it is ordinarily desired that the solvent material to be a normally liquid composition. Generally from 1 to 10, preferably 2 to 4 moles of solvent are employed per mole of cuprous organohaloaluminate or cuprous organohaloborate material. If the solvent is a ligand that forms a complex with the aluminate or borate compositions, it is generally desirable that the solvent be employed in a stoichiometric relationship to the bimetallic salt product. If desired, a stoichiometric excess of ligand material can be used with the excess material subsequently removed.

In the reaction of cuprous halides with organoaluminum compounds, generally from 0.4 to 1.5 moles, preferably 0.9 to 1.1 moles of cuprous halide is employed per mole of organoaluminum compound. The same ratios can be used when synthesizing the corresponding organohaloborates. However, with organofluoroborates about a 10% excess of reducing agent is required.

The aluminate and borate organometallic compounds may be recovered as pure compound or as complex with the solvent material employed in the reaction. Typically, when the precipitated organometallic compound or complex is a solid, the material is recovered by standard filtration or decantation operations. Soluble complexes or the organometallic compound itself are recovered by driving off any excess solvent with standard distillation techniques. Where the organometallic compound exists as a complex with the solvent material employed in its formation and it is desired to recover the organometallic material in its pure state, the complex may be decomplexed by subjecting the material to elevated temperatures and/or reduced pressures.

The aluminate and borate compounds are, as stated previously, prepared in a liquid phase system, that is, in the presence of a solvent material. Normally, the borate and aluminate compositions are prepared at temperatures ranging from $-40°$ to $300°F.$, preferably from $0°$ to $150°F.$ and most preferably from $25$ to $150°F.$ Reaction zone pressures can vary from subatmospheric to superatmospheric, for example, from 0.1 to 1,000 psi. Preferably, reaction zone pressures vary from atmospheric pressure to about 300 psi. As noted earlier, water and oxygen should be avoided during formation of the aluminate or borate compounds; however, water and/or oxygen are not detrimental when present in amounts similar to those tolerated by Ziegler-type catalysts, i.e., less than about 10 parts per million of water and/or oxygen. Some of the materials employed in the synthesis of the aluminate and borate compositions, in particular organoaluminum compounds, are potent catalysts that may, if present in substantial amounts, promote the formation of undesired by-products during the course of the aluminate and borate formation reaction. Typically, undesired side reactions can be avoided by having a stoichiometric excess of cuprous halide present when cuprous halide is employed as the reactant or at least about 0.1 mole %, preferably about 1 to 10 mole %, based on one mole of the alkali or alkaline earth metal halide salt present within the reaction zone. Particularly useful alkali or alkaline earth metal salts include sodium chloride, potassium chloride, calcium chloride, barium chloride and the like.

The novel cuprous organohaloaluminate and cuprous organohaloborate compositions when contacted with a complexible ligand readily form organometallic/complexible ligand derivatives possessing the general formula $CuMRX_3 \cdot n(L)$ wherein $n$ varies from about 0.1 to 2.0, preferably 0.3 to 2.0. The organometallic compositions as well as their complex derivatives are useful in the sorption, separation and recovery, in highly concentrated forms, of various ligands. The organometallic compositions and/or their complex derivatives, depending upon their physical state, can be employed as either liquid or solid separation media and can be contacted with ligands that are either in the gaseous or liquid state. The organometallic compositions can be used to separate a single complexible ligand from a stream containing the same or can be employed to recover a plurality of ligands that are contained in a single stream. Further, the $CuMRX_3$ compositions can be employed in combination with other solvents, in particular, $CuMX_4$ wherein M and X are as previously defined.

The cuprous organohaloaluminate or cuprous organohaloborate compositions can, in general, be used to separate and recover any composition that forms stable complexes with the same. Examples of applicable complexible ligands (L) include (a) $C_2$–$C_{20}$, preferably $C_2$–$C_{10}$, most preferably $C_2$–$C_4$ open chain (straight and branched chain) monoolefins, in particular alpha olefins, e.g., ethylene, propylene, pentene-1, octene-1, butene-2, pentene-2, dodecene-1, octene-3, 2,2-diethyl pentene-1, etc.; (b) $C_5$–$C_{10}$, preferably $C_6$–$C_8$ cyclic monoolefins such as cyclopentene, cyclohexene, 3-ethylcyclohexene, cyclooctene, etc.; (c) $C_2$–$C_6$, preferably $C_2$–$C_4$ acetylenes, for example acetylene, methylacetylene, ethylacetylene, dimethylacetylene, vinyl acetylene, etc.; (d) $C_6$–$C_{20}$, preferably $C_6$–$C_9$ aromatic compounds (defined as being aromatic compounds and alkyl substituted derivatives thereof), such as benzene, toluene, xylene, ethylbenzene, dipropylbenzene, etc.; and (e) carbon monoxide. The aluminate and borate based sorbent systems are particularly suitable for the separation and recovery of $C_2$–$C_4$ monolefins, in particular, alpha monoolefins, e.g., ethylene and propylene, $C_2$–$C_4$ acetylenic compounds, carbon monooxide and $C_6$–$C_9$ aromatic compounds. Any of the foregoing ligands can be sorbed by the aluminate or borate composition and derivatives thereof, e.g., $CuAlRX_3 \cdot n(L)$ sorb and ligand having a greater complex forming stability, that is an exchange reaction will occur wherein the more stable ligand will displace the less stable ligand.

Generally, the complexible ligand to be sorbed, that is, separated by preferential complexation and ultimately recovered, is contained in a feedstream and mixed with various other compounds that are either not sorbed or less preferentially sorbed. For example, feedstreams such as ethane/ethylene or propane/propylene can be treated to concentrate the oelfin as the paraffinic material is not sorbed by the aluminate or borate material. In cases where the stream contains a plurality of ligands, the ligands complexed with the aluminate or borate composition can be recovered from the complex by decomplexing the total aluminate or borate/ligand complex as a whole, or individually, or recovered by distillation or fractional decomplexing as the case may be.

With the present process it is possible to separate and/or recover a single ligand from the feedstream or a plurality of complexible ligands contained in the same feedstream. For example, when a feedstream that contains complexible ligands A, B and C (listed in the ascending order of the stability of their complexes) is contacted with the $CuMRX_3$ based sorbent, the following complexing reactions may take place.

(I) $2A + 2B + 2C + 3\ CuMRX_3 \rightleftharpoons CuMRX_32A$ 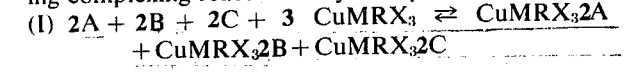
$+ CuMRX_32B + CuMRX_32C$ In this reaction, two moles of A, B and C complex with a single mole of the organometallic composition. To separately recover A, B and C in high purity, the organometallic composition/complexible ligand complex would be contacted first with B (which is a more stable complex former than A) and then with C (which is a more stable complex former than B). Finally, the ultimate complex may be essentially decomposed by heating the same. These reactions are demonstrated by the following general equations.

(II) 

(III) 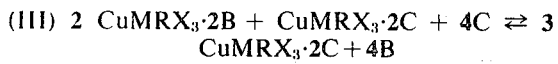

(IV) 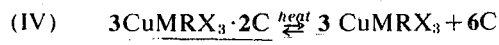

It is not essential in order to recover ligand A that the product of Equation I be contacted with ligand B. Any other complexible ligand having a greater complex forming stability than A but having a lesser complex forming stability than C could be employed in order to recover substantially pure A. Any number of ligands A, B and C may be selectively displaced from the complex of Equation I by simply contacting the cuprous composition/complexible ligand complex with a complexible ligand that forms a more stable complex than the original complex. Thus, the product of Equation I could be simply contacted with four moles of C in order to recover a substantially pure mixture of A and B.

The ultimate complex of the reaction, for example, $CuMR_rX \cdot 2C$ of Equation III can in turn be contacted with a complexible ligand that forms a more stable complex than C. However, since it is desirable to recycle the organometallic sorbent material for additional complexing, it is desirable that the ultimate complex be totally decomplexed rather than displaced or exchanged. This type of operation, which would also be used in situations where a single ligand were to be separated and recovered from a feedstream, permits the recovery of the sorbent in its original form.

All of the complex-forming operations and ligand exchange operations are equilibrium reactions. Hence, while it is possible to exchange ligand B for ligand A, for example, if B is a more stable complex-forming ligand due to certain equilibrium conditions, it is also feasible to exchange A for B by altering the equilibrium of the reaction. Therefore, if n ligands are present in a feedstream and are complexed with sufficient quantities of organohaloaluminate or organohaloborate, $n-1$ exchange or displacement reactions are required to recover the $n$ ligands individually. Alternatively, $n$ exchange or displacement zones are required to recover $n+1$ complexed complexible ligands individually. Fewer number of zones are required if all of the complexible ligands are not individually recovered. Similarly, if only one complexible ligand is to be isolated, no exchange reactions are necessary as the sole ligand can be recovered by simply subjecting the ligand containing complex to elevated temperatures and/or reduce pressure conditions in order to break down the complex and recover the more volatile complexible ligand.

The basic constituent of the complexible ligand isolation and recovery system is the previously described cuprous organohaloaluminates, cuprous organohaloborates and complexes thereof with complexible ligands. The complexing and stripping reactions wherein the aluminate and borate compositions are employed are conducted in the liquid phase. Normally, the aluminate and/or borate materials are dispersed or dissolved in a solvent system. Useful solvent systems include the materials that were previously described for use in the preparation of the basic aluminate and/or borate sorbent compositions. The previously described complexing and stripping reactions should be conducted under substantially anhydrous conditions in the substantial absence of oxygen. However, water and oxygen are not detrimental to reaction performance when present in amounts similar to those tolerated by Ziegler-type catalyst materials, that is, less than about 10 ppm. of water or oxygen. The amount of solvent system employed in the complexing and/or stripping reactions can vary over a wide range. Sufficient amounts of solvent are needed to maintain liquid phase conditions during the time of the complexing or striping reaction. Generally 1 to 10, preferably 2 to 4 moles of solvent are present within the reaction zone per mole of cuprous organohaloaluminate or cuprous organohaloborate.

The complex forming and stripping reactions can be conducted in any gas-liquid or liquid-liquid contacting device such as a sieve tray, distillation column, packed tower or the like. Preferably, the complexing and/or stripping operations are conducted under conditions whereby the stripping ligand and/or complexing ligand is in countercurrent contact with the cuprous organohaloaluminate or cuprous organohaloborate sorbent. Under such conditions, the purity of the ligand to be recovered can be further increased by recomplexing the free ligand contained within the reaction zone with additional complex as it moves through the contacting device. Recomplexing, following this technique, is similar to reflux operations that are used to improve the purity of overhead products in the distillation system.

The complex forming and stripping reactions can be carried out under a wide variety of temperature and pressure conditions provided that the sorbent complex is maintained in contact with a non-aqueous liquid system, for example, as a solution or dispersion in an aromatic diluent. The complexing and stripping reactions may be conducted at temperatures varying from $-40°$ to $300°F.$, preferably from $0°$ to $150°F.$ at pressures ranging from 0.01 to 100 atmospheres, preferably from about 0.1 to about 20 atmospheres. The decomplexing reaction used to break down the ultimate complex encountered as a by-product in multi ligand systems or, in general, any of the previously described organometallic/complexible ligand complexes, can be carried out at temperatures higher than those normally used in the complexing and/or stripping reactions. Normally, temperatures of from $50°$ to $500°F.$, preferably $200°$ to $400°F.$ and pressures varying from 0.01 to 30 atmospheres, preferably 0.1 to 20 atmospheres can be used.

The present process is particularly suitable for the separation and recovery of purified olefins from crude hydrocarbon streams, e.g., olefin containing hydrocarbon streams secured through the steam cracking of light hydrocarbon ends, or the dehydrogenation of paraffinic hydrocarbons to olefins, or products from wax cracking processes, or products from the catalytic cracking of light ends, etc. With the present process, ethylene and propylene can be recovered in purities exceeding 95%, normally 99% from ethylene, propylene, methane, ethane, propane and hydrogen mixtures than are secured from steam cracking processes.

DESCRIPTION OF THE PREFERRED EMBODIMENTS

Referring now to the drawing, which illustrates a typical processing plan for the recovery of high purity ethylene and propylene from olefin/paraffin streams, a feed mixture consisting of hydrogen, methane, ethane, propane, ethylene and propylene is introduced into absorber-stripper 11 via line 10. In absorber-stripper 11, the feedstream is contacted with a $CuAlC_2H_5Cl_3 \cdot 2(C_6-C_9$ aromatic) complex maintained in additional aromatic diluent. The sorbent complex is introduced into the absorber-stripper via line 12. A ligand exchange operation is carried out within the absorber-stripper 11 since ethylene and propylene, the major complexible ligands of the feedstream, form more stable complexes with the cuprous ethyltrichloroaluminate than does the aromatic material. Consequently, the effluent from the absorber-stripper contained in line 15 is made up of two general complexes, namely $CuAlC_2H_5Cl_3 \cdot 2$(ethylene) and $CuAlC_2H_5Cl_3 \cdot 2$(propylene) and free aromatic.

A stripping gas that is introduced into the absorber-stripper 11 via line 13 is utilized to entrain the uncomplexed feed materials, that is hydrogen, methane, ethane and propane, and sweep the same from the absorber-stripper 11 via line 14. The stripping gas can be any inert material, such as nitrogen, helium, or a complexible ligand that forms complexes less stable than the ethylene and propylene complexes already within the absorber-stripper. Preferably, the stripping gas is a portion of the pure ethylene and propylene previously recovered in the process. More preferably, an ethylene/propylene stripping gas mixture is used and is introduced into the absorber-stripper so as to prevent ligand exchange between the ethylene and propylene complexes and the consequent displacement of the ethylene by the propylene or of propylene by ethylene. Operating in this manner maintains the ethylene/propylene ratio in the cuprous ethyltrichloroaluminate complex leaving the bottom of tower 11 at the same level as that in the feed and thus recovery of both ligands is maximized.

The ethylene complex, propylene complex and free aromatic contained in line 15 are introduced into exchanger-stripper 16 and are contacted countercurrently with propylene that is introduced into the exchanger-stripper via line 20. Within the exchanger-stripper, the incoming propylene exchanges with the ethylene contained in the ethylene/$CuAlC_2H_5Cl_3$ complex (propylene forming a more stable complex with cuprous compound than ethylene and therefore displacing the ethylene). The pure ethylene displaced from the complex passes upwardly through the exchanger-stripper and exits from the exchanger-stripper via line 18. A portion of this product goes to product recovery by line 19 and a portion is utilized as stripping gas which is introduced into the absorber-stripper 11 by line 13. To secure high purity ethylene, a stream of cuprous ethyltrichloroaluminate or $CuAlC_2H_5Cl_3 \cdot 2$(aromatic) complex is introduced into exchanger-stripper 16 via line 17. With this operation, the previously freed ethylene is recomplexed with the incoming material and passes downwardly to be displaced again by further incoming propylene. Passage of fresh sorbent material through the top of the exchanger-stripper serves as a reflux operation and with increasing sorbent addition, i.e., increased recomplexing, the overhead ethylene purity in line 18 is increased.

The propylene complex and free aromatic remaining within exchanger-stripper 16 is passed in line 21 to stripper-decomplexer 22 wherein heating means 23 is used to decomplex the $CuAlC_2H_5Cl_3 \cdot 2$(propylene) complex. The decomplexed propylene is passed from stripper-complexer 22 via line 20. A portion of the recovered propylene is used to strip out ethylene in exchanger-stripper 16 and the remaining material is passed through line 24. A portion of the material in line 24 is taken as propylene product via line 25 and the last portion admixied with ethylene and passed via line 13 into absorber-stripper 11. The cuprous compound and free aromatic remaining in the stripper-complexer is passed via line 26 into solid-liquid separator 27, e.g., a filter, hydroclone, etc. wherein fine materials such as olefin-salt residues are removed. These residues are passed from the system in line 28. The cuprous ethyltrichloroaluminate and aromatic recomplex in situ and are recycled to the absorber-stripper by line 12.

As noted previously, generally $n + 1$ components can be separated individually with the present process using n exchange-strippers. To further illustrate, the feedstream entering via line 10 to the process might also contain acetylene and carbon monoxide, both of which are also complexible ligands, and, therefore, four complexible ligands will be present in the incoming feed and three exchanger-strippers would be required. It is normally desirable that the least stable ligand be stripped and removed from the system first and since the order of stability of these ligands with the cuprous compound in descending order is propylene, ethylene, acetylene and carbon monoxide, the separation of these components in high purity can be easily envisioned using a process similar to that described above. With the four component ligand system, the incoming feedstream is contacted with a sorbent system sufficient to complex substantially all of the complexible ligands contained therein. In the first exchanger-stripper acetylene is used as the stripping gas and exchanges with carbon monoxide which is recovered in high purity overhead. In the second exchanger-stripper ethylene is used as the stripping gas and exchanges with acetylene which is recovered in high purity overhead. The bottoms product from the second exchanger-stripper is then identical with the product leaving absorber-stripper 11 in the detailed process described above and the same procedure is then followed to recover the ethylene and propylene. Additional amounts of sorbent complex can be used in each of the exchanger-strippers in order to increase the purity of the overhead product from each of the exchanger-strippers.

Difficulties sometimes are encountered in decomplexing the ultimate complex from the reaction. Because of the acidic nature of the complex, polymerization or alkylation reactions are sometimes encountered during the course of the decomplexing reaction. These undesirable side reactions can be avoided by introducing at least about 0.1 mole %, preferably about 1 to 10 mole %, based on the organohalo salt of a cuprous halide or Group I-A or II-A halide salt. Particularly useful materials are sodium chloride, potassium chloride, calcium chloride, barium chloride and the like. Most preferably, cuprous chloride is employed to prevent undesired side reactions.

The present invention will be more readily understood by reference to the following examples.

EXAMPLE 1

To a slurry of 50 millimoles of cuprous chloride in 25 milliliters toluene was added at −20°C. a suspension of 50 millimoles methylaluminum dichloride in 35 milliliters of toluene. The reaction mixture was stirred and allowed to warm to ambient temperature. All solids went into solution with exception of a few particles to form a $CuAlCH_3Cl_3 \cdot 2$ toluene sorbent complex. The same reaction was carried out using a cyclohexene diluent specifically a total of 100 milliliters of cyclohexene. Again a clear solution of the complex between cyclohexene and cuprous aluminum methyl trichloride was formed. It was found that cuprous aluminum-methyltrichloride is insoluble in non-complexing solvent like pentane.

EXAMPLE 2

To a slurry of 100 millimoles of cuprous chloride in 40 milliliters cyclohexene were added a solution of 100 millimoles of ethylaluminum dichloride at ambient temperature over a period of one-half hour. All solid went into solution after stirring. A soluble complex between cyclohexene and cuprous aluminum-ethyltrichloride had formed. This complex in excess of cyclohexene corresponds to the formula $CuAlC_2H_5Cl_3 \cdot 2$ (cyclohexene). Upon attempting to isolate the above complex by vacuo treatment at ambient temperature a viscous complex having the formula $CuAlC_2H_5Cl_3 \cdot 1$ (cyclohexene) was obtained. In a separate experiment it was shown that cuprous aluminum-ethyl-trichloride is insoluble in saturated hydrocarbons. In another test it was shown that cuprous aluminum-ethyl-trichloride forms a soluble complex with two moles of benzene.

EXAMPLE 3

To a slurry of 50 millimoles of cuprous chloride in 50 milliliters cyclohexene were added 50 millimoles of isobutylaluminum dichloride dissolved in 50 millimoles cyclohexene at −20°C. with stirring. The mixture was warmed to ambient temperatures. A clear solution was obtained indicating that a complex had been formed in which the cuprous aluminum-isobutyl-trichloride was complexed with cyclohexene. Similarly, a complex between cuprous aluminum-isobutyl-trichloride and toluene was prepared.

EXAMPLE 4

Following the procedure of Example 1, a suspension of 50 millimoles cuprous chloride in 50 milliliters of pentene-1 were added to 50 millimoles of methylaluminum dichloride in 50 milliliters of pentene-1 at −20°C. After stirring and warming to ambient temperature a clear solution was obtained indicating the formation of a soluble 2:1 molar pentene-1 complex.

EXAMPLE 5

To a suspension of 25 millimoles cuprous bromide in 25 milliliters cyclohexene were added at −20°C. with stirring 25 millimoles of methylaluminum dichloride in 25 milliliters of cyclohexene. After warming to ambient temperature a solution of a complex having the formula $CuAlCH_3Cl_2BR \cdot 2$ (cyclohexene) was obtained.

EXAMPLE 6

When carrying out the reaction of Example 1 with the same molar amount of trimethylaluminum instead of methylaluminum dichloride an incomplete reaction was achieved. Workup gave 3.2 grams of red-brown solid and a solution which contained only small amounts of soluble copper complexes.

When the reaction of Example 1 was carried out with the same molar amount of dimethylaluminum monochloride a large amount (3.7 g.) of red colored solid was again recovered andn the solution contained an aluminum to copper ratio (atomic ratio) of 4.1:1 instead of 1:1. Thus the above two types of organo aluminum compounds did not give the desired soluble complexes.

EXAMPLE 7

To a slurry of 50 millimoles cuprous chloride in 25 milliliters of toluene was added with stirring at −20°C. a solution of 10.3 g methylaluminum sesquichloride (100 millimoles of aluminum) in 25 milliliters toluene. After warming to ambient temperature a clear solution was obtained indicating that the sesquichloride could be used for the preparation of the desired soluble complexes.

EXAMPLE 8

40 ml. of a $CuAlC_2H_5Cl_3 \cdot 2$ benzene complex was charged to a 100 ml. round bottom flask in a dry box. A feed mixture of 53 mole % ethylene:47 mole % ethane was then bubbled into the flask under the surface of the liquid and just above a magnetic stirring bar located in the bottom of the flask. Samples of the gas leaving the flask were analyzed by gas chromatography using a silica gel column at 78°C. and 10 psig helium pressure. After the solution was completely saturated at 24°C. and one atmosphere as shown by the exit gas having the same composition as the feed gas, the solution was regenerated by heating to 45°C. with a stream of $N_2$ flowing through the liquid complex. The decomplexed product was also analyzed by gas chromatography and was found to contain 95 mole % ethylene.

This data indicates that a single stage of gas absorption by chemical complexing can be used to give appreciable ethylene purification by ligand exchange of ethylene and for the benzene present in the initial complex.

EXAMPLE 9

34 ml. of the 1.34 molar solution of $CuAlCH_3Cl_3$ in benzene was charged in a dry box into a 100 ml. graduate equipped with a gas disperser. Pure propylene, at 1 atmosphere pressure and 24°C., was added until the solution was saturated and had increased in weight by 10.2 wt. %, based on the original solution. This compares to a physical solubility of 2.7 wt. % and illustrates that the propylene is complexing with the copper by ligand exchange with the benzene to the extent of at least 1.3 moles of propylene/mole copper. On heating 8 ml. of the complexed sample to 100°C. in a sealed container, a pressure of 72 psig was generated. This shows that the propylene is reversibly complexed and can be recovered by heating.

EXAMPLE 10

32 ml. of the 2.45 molar solution of $CuAlCH_3Cl_3$ in cyclohexene was charged in a dry box to a 100 ml. graduate containing a gas disperser and magnetic stirrer. Dry propylene at 1 atmosphere and 24°C. was used to saturate the solution. In this case only 5.0 wt. % of propylene was absorbed. This demonstrates that it is much more difficult to displace cyclohexene from the $Cu(Me)AlCl_3$ complex than it is to displace aromatic molecules (Example 9).

On heating 8 ml. of the complexed sample to 100°C., a pressure of 51 psig was generated. Analysis of this gas by gas chromatography showed it to be propylene, again indicating reversible complexing of the propylene.

EXAMPLE 11

48 ml. of the complex of $CuAlCH_3Cl_3$ in benzene was charged to a 100 ml. graduate equipped with a gas disperser and magnetic stirrer. A feed mixture of 36 mole % propylene in 64% propane was bubbled into the solution at 25°C. and 1 atmosphere. The tail gas composition leaving the bubbler was analyzed by gas chromatography. After the solution was completely saturated the solution was analyzed and found to containn 0.7 moles of propylene per mole of copper. The solution was then regenerated by heating to its boiling point to drive off the complexed gas which was also analyzed by gas chromatography.

Initial Tail Gas, Mole % $C_3^= = 1.8$

Decomplexed Product, Mole % $C_3^= = 98.0$

These data show that a single stage of gas absorption by chemical complexing can be used to give appreciable propylene purification by ligand exchange of propylene for the original benzene complex component.

What is claimed is:

1. A complex cuprous organometallic composition having the general formula $CuMRX_3 \cdot n(L)$ wherein M is selected from the group consisting of aluminum and boron atoms, X is selected from the group consisting of chlorine, bromine and fluorine atoms, R is an organic radical selected from the group consisting of a $C_1$ to $C_4$ alkyl radical, a phenyl radical, a $C_7$ to $C_{10}$ alkylaryl radical and halogen substituted $C_1$ to $C_4$ alkyl, phenyl and $C_7$ to $C_{10}$ alkylaryl radicals, n varies from about 0.3 to 2.0 and L is a complexible ligand, said ligand selected from the group consisting of carbon monoxide, $C_2$ to $C_{20}$ open chain monoolefins, $C_5$ to $C_{10}$ cyclic monoolefins and $C_2$ to $C_6$ acetylenes.

2. The composition of claim 1 wherein M is an aluminum atom.

3. The composition of claim 1 wherein X is a chlorine atom.

4. The composition of claim 1 wherein R is a $C_1$ to $C_4$ alkyl radical.

5. The composition of claim 1 wherein said complexible ligand is selected from the group consisting of $C_2$ to $C_{10}$ open chain monoolefins, $C_2$ to $C_4$ acetylenes and carbon monoxide.

6. The composition of claim 5 wherein M is an aluminum atom.

7. The composition of claim 5 wherein X is a chlorine atom.

8. A composition of claim 5 wherein R is a $C_1$ to $C_4$ alkyl radical.

9. The composition of claim 1 wherein M is an aluminum atom, X is a chlorine atom and B is a $C_1$–$C_4$ alkyl radical.

10. The composition of claim 9 wherein said complexible ligand is selected from the group consisting of carbon monoxide, $C_2$–$C_4$ open chain monoolefins, $C_2$–$C_4$ acetylenic compounds.

11. The composition of claim 1 wherein said complexible ligand is selected from the group consisting of $C_2$–$C_4$ open chain monoolefins, $C_2$–$C_4$ acetylenic compounds and carbon monoxide.

12. The composition of claim 9 wherein said complexible ligand is selected from the group consisting of ethylene and propylene.

* * * * *